United States Patent
Cooper

(10) Patent No.: US 6,535,751 B1
(45) Date of Patent: Mar. 18, 2003

(54) ASSOCIATING DIAL NUMBERS WITH CALL ORIGINATION SCHEMES

(75) Inventor: Rotem Cooper, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/413,077

(22) Filed: Oct. 5, 1999

(51) Int. Cl.⁷ .................................................. H04Q 7/20
(52) U.S. Cl. ........................................ 455/564; 455/415
(58) Field of Search .................................. 455/407, 403, 455/414, 415, 434, 550, 551, 552, 553, 564, 418, 420, 419; 379/45, 142, 157, 201, 354, 221.06, 221.02, 355, 114

(56) References Cited

U.S. PATENT DOCUMENTS

| | | | | |
|---|---|---|---|---|
| 5,459,774 A | * | 10/1995 | Breeden ...................... | 455/566 |
| 5,509,060 A | * | 4/1996 | Hall et al. ................... | 379/207 |
| 5,602,901 A | * | 2/1997 | Redden et al. ............... | 455/404 |
| 5,638,433 A | | 6/1997 | Bubien, Jr. et al. ......... | 379/130 |
| 5,722,088 A | * | 2/1998 | Storn et al. .................. | 455/564 |
| 5,754,953 A | * | 5/1998 | Briancon et al. ............ | 455/418 |
| 5,905,447 A | * | 5/1999 | Eaton et al. ................. | 340/7.44 |
| 6,125,174 A | * | 9/2000 | Watanabe ..................... | 379/142 |
| 6,408,191 B1 | * | 6/2002 | Blanchard et al. ........... | 455/412 |

FOREIGN PATENT DOCUMENTS

| | | | | |
|---|---|---|---|---|
| WO | 9823108 | 5/1998 | ............ | H04Q/7/22 |
| WO | 9946911 | 9/1999 | .......... | H04M/1/274 |

\* cited by examiner

*Primary Examiner*—Nay Maung
*Assistant Examiner*—Jean A Gelin
(74) *Attorney, Agent, or Firm*—Philip Wadsworth; Charles Brown; Howard Seo

(57) ABSTRACT

A call origination scheme (300) for a wireless telephone lists the number of silent redials to make (302), preferred mode (analog, digital, and so on) (304), and so on. Each telephone number which can be dialed by the wireless telephone is associated (102) with a scheme, and data representative of this association (104) are stored in the telephone. When a number is entered into the telephone (106), as be depressing a sequence of keys on a keypad, the telephone determines (108) the scheme associated with that number and places the call (110) according to that scheme.

20 Claims, 3 Drawing Sheets

ASSOCIATING DIAL NUMBERS WITH CALL ORIGINATION SCHEMES

TECHNICAL FIELD

This invention relates to wireless telephone, and has particular relation to automatically determining the proper origination scheme for a call being placed from a wireless telephone.

BACKGROUND ART

In a landline telephone system, a telephone call is a telephone call. If the call goes through, it goes through. If it doesn't, the user calls again later.

Moreover, the network or service provider of a landline phone makes no attempt to optimize the system to further increase the probability that a call origination will go through.

Some devices have automatic redial. If a sending fax machine calls a receiving fax machine, and the receiving fax machine is busy, the sending fax machine tries again, at progressively longer intervals, until the call goes through or a predetermined maximum number of attempts is reached. A home computer attempting to reach an Internet Service Provider will make similarly repeated attempts if it does not get through the first time. Further flexibility is not possible in a landline telephone system. A telephone call is a telephone call.

BRIEF DISCLOSURE OF THE INVENTION

Applicant has noted that, in a wireless telephone system, not all telephone calls are the same, and not all networks are the same. For example, some networks have Code Division Multiple Access ("CDMA") and Advanced Mobile Phone System ("AMPS") systems capabilities while other networks have only CDMA systems. In addition, a network might be more or less likely to return a specific call origination failure indications, such as a REORDER or INTERCEPT, in comparison to a different network. Furthermore, distinct networks will usually also vary in the origination failure indication time period, that is, the time period from the call origination start time to when the mobile receives an origination failure indication from the network.

Another variable that has to be accounted for is the call type. For example, while a regular call might be silently re-dialed a maximum of 4 times within 30 seconds, an emergency 911 call needs to be re-dialed endlessly until call is successfully connected (or battery is empty).

In order to optimize the origination schemes of different call types, a call plan is associated with each such call type. A call type is simply a subset of dial-strings that are grouped together and associated with a particular predefined call type. Example of predefined call types are voice, Emergency, Data, Fax, Packet, OTASP (Over The Air Service Provisioning), Test (Markov, Loopback), and SMS (Short Message Service).

With each such call type there is associated a set of dial strings. For example, the dial-string subset {"911", "*911", "#911"} might be associated with the emergency call type. In other words, any dial string that is within this set will be considered of type "emergency" while dial strings that are not within this set are not considered of type "emergency".

Different wireless service providers are available to the user of a wireless telephone. These providers offer different services, with different prices, to the wireless telephone user, and these services and prices depend on the telephone number being called. The user of a wireless telephone can thus customize a call origination scheme based on the telephone number (or at least the type of telephone number) being called. A "call origination scheme" is a decision as to how many times to attempt to redial, which service provider to use, which (Code Division Multiple Access vs. Frequency Division Multiple Access, for example) of service to use, etc.

Table 1 shows a preferred Origination Plan Table. As shown in Table 1, each entry of the call origination plan table associates a call-type and/or a dial-string with a call origination plan. The call-origination plan holds all the information that is necessary to conduct the origination process for the associated call-type and/or dial-string.

Table 2 is an explanation of the fields shown in Table 1.

Table 3 is an Origination Plan Table Example. Note that the table is being searched from top to bottom. In the case where a particular call-type/dial-string can be matched against more than one table entry, the first entry from the top will dictate the origination plan.

The origination plan can be specified using a table or a set of tables, as illustrated below. In such a table, each entry specifies the origination plan variables that are associated with a particular call type. Alternatively, the origination plan variables can replaced with a script (see FIG. 3).

TABLE 1

Origination Plan Table

| Match fields | Origination Plan | | | | | | | | | |
|---|---|---|---|---|---|---|---|---|---|---|
| call_type | mc_ho | pwr_ho | sr_prd_t | sr_max_d | sr_max_t | no_srv | fade | reorder | intercept | release |

TABLE 2

Explanation of Fields

| Field | | Explanation |
|---|---|---|
| Match fields | call_type | Indicate the call type corresponding to this origination plan entry. |
| Origination Plan Fields | mc_ho | Indication whether we should honor hold-origination indication from the call-processing task during the origination process. |
| | pwr_ho | The max time we should hold the origination during power-up, giving service a chance to appear before starting the call origination process. |
| | sr_prd_t | The time we should wait after a dial (redial) attempt failure before we try the next silent redial attempt. |

TABLE 2-continued

Explanation of Fields

| Field | Explanation |
|---|---|
| sr_max_d | The max numbers of dial (redial) attempts, after which we declare call-origination failure. |
| sr_max_t | The max time for silently redialing, after which we declare call-origination failure. |
| no_srv | Action to take when dial (redial) attempt fails due to no-service indication from the network. |
| fade | Action to take when dial (redial) attempt fails due to fade indication from the network. |
| reorder | Action to take when dial (redial) attempt fails due to reorder indication from the network. |
| intercept | Action to take when dial (redial) attempt fails due to intercept indication from the network. |
| release | Action to take when dial (redial) attempt fails due to release indication from the network. | origination scheme is associated (102) with at least a second possible telephone number. Each scheme may be associated with as many telephone numbers as is convenient, and there may be as many schemes as is convenient, but each telephone number is associated with only one scheme. Data representative of each of the associations is then stored (104) in the wireless telephone.

The phrase "wireless telephone" is used in the broad sense herein, and means any device which is capable of placing a call over a wireless telephone network. It therefore is not limited to conventional wireless telephones as such, but also includes wireless fax machines, wireless computers, and the like.

A telephone number is then entered (106) into the wireless telephone, as by depressing a sequence of keys on a keypad. This number has previously been associated with a call origination scheme. The wireless telephone thereupon determines (108) the scheme previously associated with the just-entered telephone number. The telephone then places the call (110) according to the associated scheme.

The association process (102) may be a direct association, or it may be in two parts. In the latter situation, the telephone numbers are first grouped into types (112), and then each

TABLE 3

Origination Plan Example Table

| Match fields | Origination Plan | | | | | | | | | |
|---|---|---|---|---|---|---|---|---|---|---|
| call_type | mc_ho | pwr_ho | sr_prd_t | sr_max_d | sr_max_t | no_srv | fade | reorder | intercept | release |
| E911 | Yes | 12 s | 4 s | 10,000 | 10,000 s | Redial | Redial | Redial | Redial | Redial |
| Std-OTASP | No | 0 s | 0 s | 0 | 10,000 s | None | End-orig | End-orig | End-orig | End-orig |
| Non-std-OTASP | Yes | 12 s | 4 s | 4 | 30 | Force to AMPS and redial | Force to AMPS and redial | Force to AMPS and redial | End-orig | End-orig |
| Voice | Yes | 12 s | 4 s | 4 | 30 | Redial | Force to AMPS and redial | Force to AMPS and redial | End-orig | End-orig |

DETAILED DESCRIPTION OF THE PREFERRED EMBODIMENTS

Figures 1, 2:
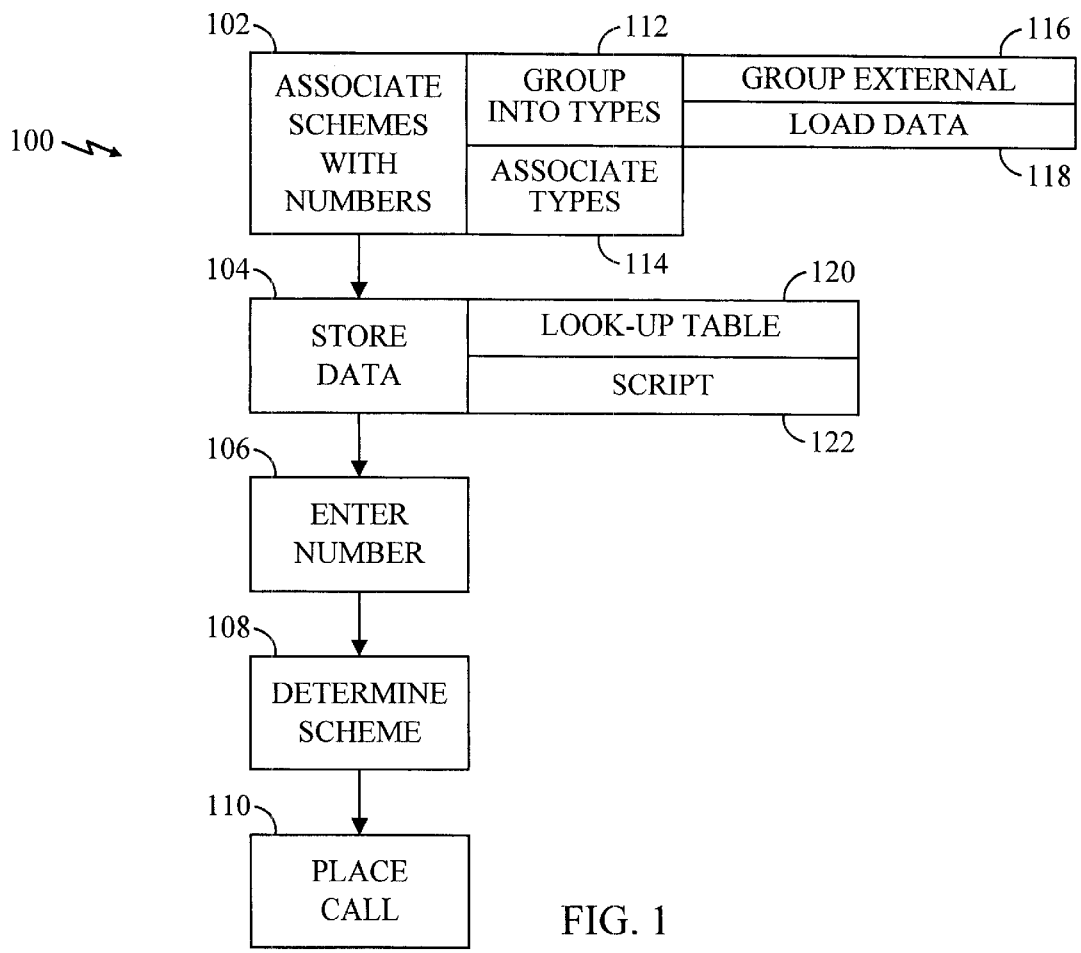
FIG. 1 is a flow chart of the method according to the present invention.
FIG. 2 is a table used in the method of FIG. 1.

FIG. 1 is a flow chart of the method (100), according to the present invention, for originating a wireless telephone call. A first call origination scheme is associated (102) with at least a first possible telephone number, and a second call type is associated with a call origination scheme (114). In this case, it is required that at least a first plurality of telephone numbers be grouped into a first type and a second plurality of numbers be grouped into a second type. The first type is then associated with a first call origination scheme and the second type is associated with a second origination scheme. Additional types may be used if desired.

It is possible to enter a telephone number into the wireless telephone and then assigned it to a type. It is often more convenient, however, for the grouping to take place external (116) to the wireless telephone, and to load data (118) representative of the grouping into the telephone. This permits a single model of telephone to be manufactured for a number of wireless service providers. Each service provider loads the data best suited to its own purposes FIG. 2 is a table (200) used in the method of FIG. 1. The left-most cell of each row shows individual telephone numbers. The remaining cells indicate the elements of the call origination scheme associated with that telephone number. This includes such matters as the number of silent redials to be made if the first dial does not go through, whether Advanced Mobile Phone System (AMPS) should be forced, whether the telephone should wait for service if its request for service is intercepted, and so on. A call is "intercepted" if immediate service is denied, but an indication is made that service will be available shortly. Interception thus differs from denial, in that a denied call will not be served for the foreseeable future. These elements are examples only, and other elements could also be used, as indicated by the jagged right edge of the table. The jagged bottom edge of the table indicates that additional telephone numbers could be used. The numbers shown are also only examples.

Figure 3:
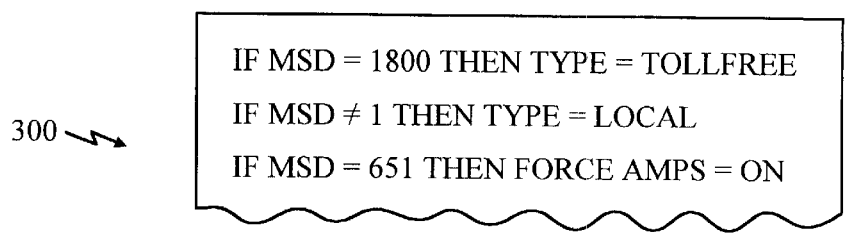
FIG. 3 is a script used in the method of FIG. 1.

FIG. 3 is a script (300) used in the method of FIG. 1. Rather than attempting to exhaustively list every possible telephone number, a script (computer program) takes the Most Significant Digit (MSD) or other information about the telephone number and assigns a type to it, or sets an element of a call origination scheme (as shown in the last line). A script and a look-up table may be used in combination if desired.

Figure 4:
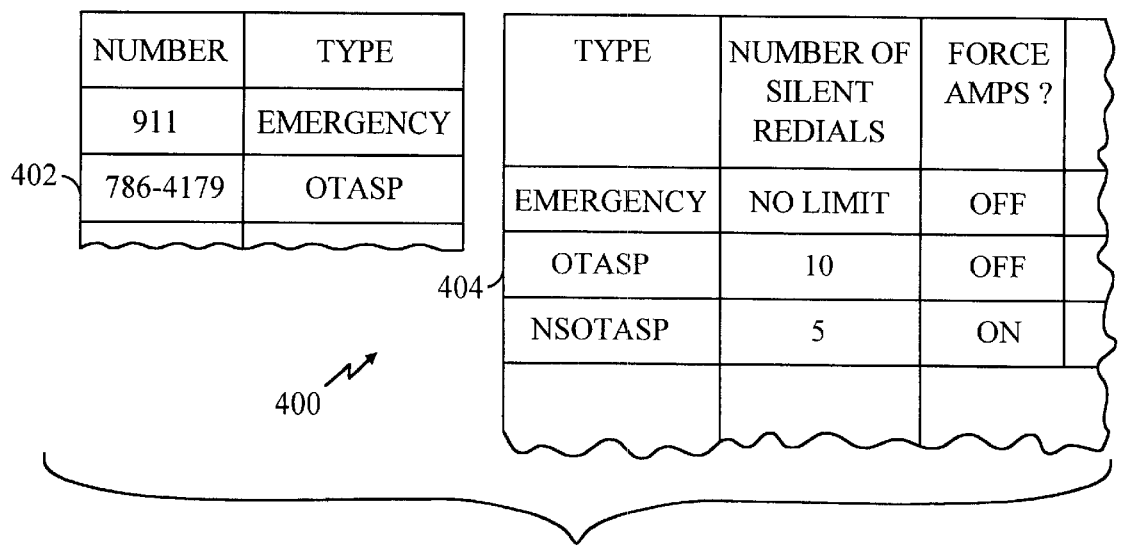
FIG. 4 is a pair of tables showing the use of typing in the method of FIG. 1.

FIG. 4 is a pair (400) of tables showing the use of typing in the method of FIG. 1. The first table (402) associates each telephone number with a type. The second table (404) associates each type with a call origination scheme. For example, the wireless service provider may have an Over-The-Air Service Provisioning (OTASP) number. This is a number which a new purchaser of a wireless telephone calls to get service from a wireless service provider. The call origination scheme for such calls (how many silent redials, whether to force AMPS, and so on) is often different from the scheme for a conventional call. If the OTASP number is Non-Standard (NSOTASP), its scheme will be different still. The service provider may have several OTASP numbers, so as to allow several new customers to sign up simultaneously. It is often convenient for each of these numbers to be associated only with the type "OTASP". This avoids the need for repeating, for every telephone number, every element of the call origination scheme associated with the OTASP type.

Figure 5:
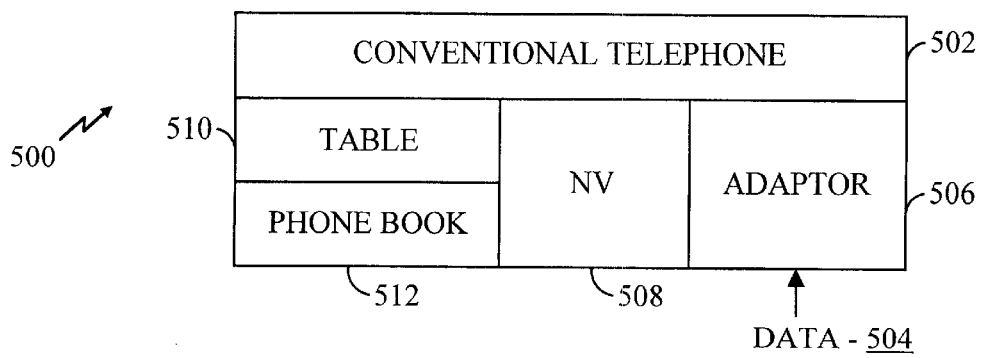
FIG. 5 is a block diagram of a telephone according to the present invention.
Figure 6:
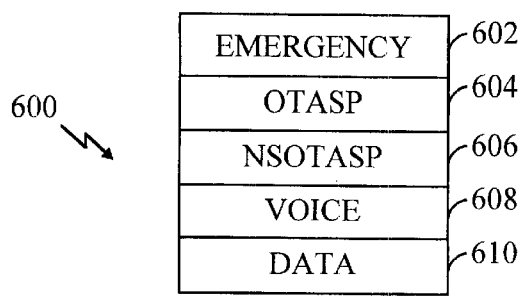
FIG. 6 shows some of the types used in FIG. 4.

FIG. 5 is a block diagram of a telephone (500) according to the present invention. A conventional telephone (502) receives data (504) through an adaptor (506). These data are representative of the look-up table, or of the groupings of telephone numbers into types. These data are stored in non-volatile memory (508). They may include a look-up table (510), a telephone book (512) of grouped numbers, or both FIG. 6 shows some of the types (600) used in FIG. 4. These include emergency (602), Over-The-Air Service Provisioning (OTASP) (604), Non-Standard Over-The-Air Service Provisioning (NSOTASP) (606), voice (608), and data (610). Other types may be used instead of or in addition to the types shown.

Figure 7:
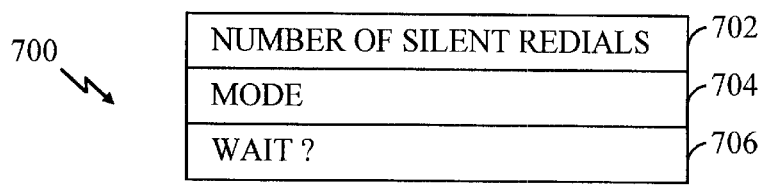
FIG. 7 shows some of the elements of the call origination scheme included in FIG. 1.

FIG. 7 shows some of the elements (700) of the call origination scheme included in FIG. 1. These include as the number of silent redials (702) to be made if the first dial does not go through, the preferred mode (704) of service, whether the telephone should wait (706) for service if its request for service is intercepted, and so on. "Modes" of service include such matters as the technology to be used (Code Division Multiple Access—CDMA, Time Division Multiple Access—TDMA, Advanced Mobile Phone Service—AMPS, and so on), the frequency of operation (cellular—800 MHz, Personal Communication System—PCS—1900 MHz, and so on), and similar factors.

Figure 8:
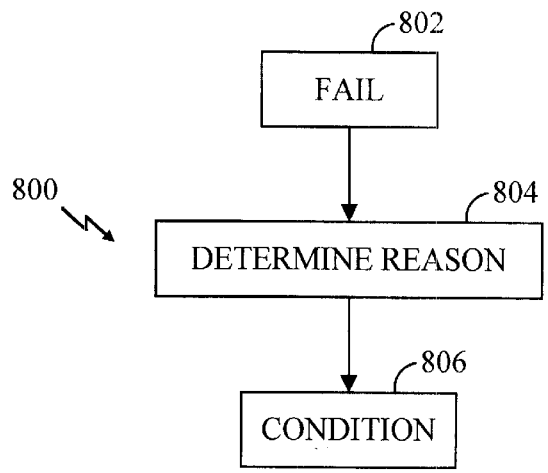
FIG. 8 is a block diagram of a failure handling routine according to the present invention.

FIG. 8 is a block diagram (800) of a failure handling routine according to the present invention. Upon a failure (802) to obtain service after dialing a telephone number, the telephone determines the reason for the failure, and conditions at least one element of one subsequent origination attempt on that reason.

Figure 9:
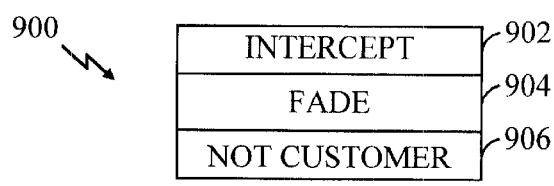
FIG. 9 shows some of the reasons for failure handled by the routine of FIG. 8.

FIG. 9 shows some of the reasons (900) for failure handled by the routine of FIG. 8. If the call was intercepted (902), then a typical call origination scheme for a data call would provide for a redial in the same mode, after a short delay. A typical call origination scheme for an emergency call would provide for an immediate redial using a different mode. However, if the reason were a fade (904), then a typical scheme for all types of call would be to delay briefly and try again. If the reason were not-a-customer (906), then a switch to a different service provider would be required in all schemes. These schemes are examples only, and others could be used. Likewise, the above reasons for failure are examples only, and other reasons could be used instead of or in addition to them Industrial Application My invention is capable of exploitation in industry, and can be made and used, whenever is it desired to associate dial numbers with call origination schemes. The individual components of the apparatus and method shown herein, taken separate and apart from one another, may be entirely conventional, it being their combination which I claim as my invention.

While I have described various modes of apparatus and method, the true spirit and scope of my invention are not limited thereto, but are limited only by the following claims and their equivalents, and I claim such as my invention:

What is claimed is:

1. A method for originating a wireless telephone call, characterized in that the method includes:
   (a) associating (102) at least:
      (1) a first call origination scheme with at least a first possible telephone number to be called; and
      (2) a second call origination scheme with at least a second possible telephone number to be called;
   (b) storing (104) data representative of the associations in a wireless telephone;
   (c) entering (106) one of the telephone numbers into the wireless telephone;
   (d) determining (108) the call origination scheme associated with the entered telephone number; and
   (e) placing (110) the call according to the associated call origination scheme,
      wherein the first and the second call origination schemes include at least one of the following:
      a number of attempts to redial, a name of the service provider to use and a mode of service to use for the telephone number to be called.

2. The method of claim 1, further characterized in that the data include a look-up table.

3. The method of claim 1, further characterized in that the data include a script (122).

4. The method of claim 1, further characterized in that the associating includes:
   (a) grouping (112):
      (1) at least a first plurality of telephone numbers into a first type; and
      (2) at least a second plurality of telephone numbers into a second type; and
   (b) associating (114):
      (1) the first call origination scheme with the first type; and
      (2) the second call origination scheme with the second type.

5. The method of claim 4, further characterized in that:
   (a) the grouping takes place external (116) to the wireless telephone; and
   (b) data representative of the grouping are loaded (118) into the telephone.

6. The method of claim 4, further characterized in that at least one type is at least one of the following:
   (a) emergency (602);
   (b) standard over-the-air service provisioning (604);
   (c) non-standard over-the-air service provisioning (606);
   (d) voice (608); and
   (e) data (610).

7. The method of claim 4, further characterized in that the method includes storing the grouped telephone numbers in a telephone book (512) in the wireless telephone.

8. The method of claim 1, further characterized in that each call origination scheme includes at least one of the following elements:
   (a) a number originations (702) to attempt if the first origination attempt fails;
   (b) a preferred mode (704) of service; and
   (c) whether to wait for service if it is not immediately available (706).

9. The method of claim 1, further characterized in that the method includes, for at least one call origination scheme:
   (a) determining (804) a reason why a failed origination attempt failed; and
   (b) conditioning (806) at least one element of at least one subsequent origination attempt on the reason.

10. The method of claim 9, further characterized in that the reason includes, for at least one call origination scheme, at least one of the following events:
    (a) intercept (902);
    (b) fade (904); and
    (c) not a customer (906).

11. Apparatus for originating a wireless telephone call, characterized in that the apparatus includes:
    (a) means for associating (102) at least:
       (1) a first call origination scheme with at least a first possible telephone number to be called; and
       (2) a second call origination scheme with at least a second possible telephone number to be called;
    (b) means for storing (104) data representative of the associations in a wireless telephone;
    (c) means for entering (106) one of the telephone numbers into the wireless telephone;
    (d) means for determining (108) the call origination scheme associated with the entered telephone number; and
    (e) means for placing (110) the call according to the associated call origination scheme,
       wherein the first and the second call origination schemes include at least one of the following:
    a number of attempts to redial, a name of the service provider to use and a mode of service to use for the telephone number to be called.

12. The apparatus of claim 11, further characterized in that the data include a look-up table (120).

13. The apparatus of claim 11, further characterized in that the data include a script (122).

14. The apparatus of claim 11, further characterized in that the means for associating includes:
    (a) means for grouping (112):
       (1) at least a first plurality of telephone numbers into a first type; and
       (2) at least a second plurality of telephone numbers into a second type; and
    (b) means for associating (114):
       (1) the first call origination scheme with the first type; and
       (2) the second call origination scheme with the second type.

15. The apparatus of claim 14, further characterized in that:
    (a) the grouping takes place external (116) to the wireless telephone; and
    (b) data representative of the grouping are loaded (118) into the telephone.

16. The apparatus of claim 14, further characterized in that at least one type is at least one of the following:
    (a) emergency (602);
    (b) standard over-the-air service provisioning (604);
    (c) non-standard over-the-air service provisioning (606);
    (d) voice (608); and
    (e) data (610).

17. The apparatus of claim 14, further characterized in that the apparatus includes means for storing the grouped telephone numbers in a telephone book (512) in the wireless telephone.

18. The apparatus of claim 11, further characterized in that each call origination scheme includes at least one of the following elements:
    (a) a number of originations (702) to attempt if the first origination attempt fails;
    (b) a preferred mode (704) of service; and
    (c) whether to wait for service if it is not immediately available (706).

19. The apparatus of claim 11, further characterized in that the apparatus includes, for at least one call origination scheme:
    (a) means for determining (804) a reason why a failed origination attempt failed; and
    (b) means for conditioning (806) at least one element of at least one subsequent origination attempt on the reason.

20. The apparatus of claim 19, further characterized in that the reason includes, for at least one call origination scheme, at least one of the following events:
    (a) intercept (802);
    (b) fade (804); and
    (c) not a customer (806).

* * * * *

UNITED STATES PATENT AND TRADEMARK OFFICE
CERTIFICATE OF CORRECTION

PATENT NO. : 6,535,751 B1
DATED : March 18, 2003
INVENTOR(S) : Rotem Cooper

It is certified that error appears in the above-identified patent and that said Letters Patent is hereby corrected as shown below:

Column 8,
Line 55, change "(802)" to -- (902) --.
Line 56, change "(804)" to -- (904) --.
Line 57, change "(806)" to -- (906) --.

Signed and Sealed this

Ninth Day of May, 2006

JON W. DUDAS
*Director of the United States Patent and Trademark Office*